United States Patent
Li et al.

(10) Patent No.: US 10,563,153 B2
(45) Date of Patent: Feb. 18, 2020

(54) RHEOLOGY MODIFIED LOW FOAMING LIQUID ANTIMICROBIAL COMPOSITIONS AND METHODS OF USE THEREOF

(75) Inventors: Junzhong Li, Apple Valley, MN (US); Steven J. Lange, St. Paul, MN (US); Richard K. Staub, Lakeville, MN (US); David D. McSherry, St. Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 1471 days.

(21) Appl. No.: 13/112,624

(22) Filed: May 20, 2011

(65) Prior Publication Data

US 2012/0136051 A1    May 31, 2012

Related U.S. Application Data

(60) Provisional application No. 61/346,804, filed on May 20, 2010.

(51) Int. Cl.
| | | |
|---|---|---|
| *A01N 41/02* | (2006.01) |
| *A01N 41/04* | (2006.01) |
| *A01N 25/22* | (2006.01) |
| *C11D 3/48* | (2006.01) |

(52) U.S. Cl.
CPC ..................... *C11D 3/48* (2013.01)

(58) Field of Classification Search
CPC ........ A01N 41/02; A01N 41/04; A01N 25/22; A01P 1/10; A23B 7/53
See application file for complete search history.

(56) References Cited

U.S. PATENT DOCUMENTS

| | | | |
|---|---|---|---|
| 3,852,415 A | 12/1974 | Vandervoorde |
| 3,985,670 A | 10/1976 | Berg et al. |
| 4,003,971 A | 1/1977 | Mannara |
| 4,069,311 A | 1/1978 | Mannara |
| 4,069,312 A | 1/1978 | Mannara |
| 4,092,261 A | 5/1978 | Sperling et al. |
| 4,122,025 A | 10/1978 | Kiewert et al. |
| 4,163,795 A | 8/1979 | Burk |
| 4,163,796 A | 8/1979 | Burk |
| 4,163,797 A | 8/1979 | Burk et al. |
| 4,163,798 A | 8/1979 | Burk et al. |
| 4,175,062 A | 11/1979 | Disch et al. |
| 4,179,391 A | 12/1979 | Kaufmann et al. |
| 4,181,621 A | 1/1980 | Raaf et al. |
| 4,190,668 A | 2/1980 | Burk et al. |
| 4,225,669 A | 9/1980 | Melnick et al. |
| 4,228,048 A | 10/1980 | Tesdahl |
| 4,232,041 A | 11/1980 | Burk et al. |
| 4,241,080 A | 12/1980 | Burk |
| 4,421,665 A | 12/1983 | Lloyd et al. |
| 4,424,204 A | 1/1984 | Minamino |
| 4,485,029 A | 11/1984 | Kato et al. |
| 4,632,847 A | 12/1986 | Lomasney et al. |
| 4,654,208 A | 3/1987 | Stockel et al. |
| 4,715,980 A | 12/1987 | Lopes et al. |
| 4,725,319 A | 2/1988 | Osberghaus |
| 4,776,974 A | 10/1988 | Stanton et al. |
| 4,802,997 A | 2/1989 | Fox et al. |
| 4,826,689 A | 5/1989 | Violanto |
| 4,973,466 A | 11/1990 | Reich |
| 5,015,408 A | 5/1991 | Reuss |
| 5,049,383 A | 9/1991 | Huth et al. |
| 5,087,757 A | 2/1992 | Mariam et al. |
| 5,112,750 A | 5/1992 | Tanaka et al. |
| 5,116,620 A | 5/1992 | Chvapil et al. |
| 5,128,342 A | 7/1992 | Globus |
| 5,147,884 A | 9/1992 | Diehl et al. |
| 5,158,766 A | 10/1992 | Greenwald et al. |
| 5,158,772 A | 10/1992 | Davis |
| 5,158,887 A | 10/1992 | Hse et al. |
| 5,186,857 A | 2/1993 | Ramirez et al. |
| 5,234,719 A | 8/1993 | Richter et al. |
| 5,273,674 A | 12/1993 | Kottwitz et al. |
| 5,280,042 A | 1/1994 | Lopes |
| 5,288,493 A | 2/1994 | Martino et al. |
| 5,314,687 A | 5/1994 | Oakes |
| 5,401,783 A | 3/1995 | Bowen |
| 5,403,587 A | 4/1995 | McCue et al. |
| 5,407,700 A | 4/1995 | Man |
| 5,436,008 A | 7/1995 | Richter et al. |
| 5,510,052 A | 4/1996 | McCandlish |
| 5,531,982 A | 7/1996 | Gaffar et al. |
| 5,540,920 A | 7/1996 | Vinopal et al. |

(Continued)

FOREIGN PATENT DOCUMENTS

| | | |
|---|---|---|
| EP | 0879276 | 12/1996 |
| EP | 1276372 | 1/2003 |
| EP | 1259113 | 4/2004 |
| WO | 0143549 A2 | 7/2001 |
| WO | WO01/64035 | 9/2001 |
| WO | WO2001/064035 | 9/2001 |
| WO | 2005005587 A2 | 1/2005 |
| WO | 2006055788 A1 | 5/2006 |

OTHER PUBLICATIONS

Charteris, William P., "Physicochemical Aspects of the Microbiology of Edible Table Spreads", International Journal of Dairy Technology 2007 vol. 48 Issue 3:87-96.

Lakkis, Jamileh M., "Confectionery Products as Delivery Systems for Flavors, Health, and Oral-Care Actives", Encapsulation and Controlled Release Technologies in Food Systems 2007.

Kim, Jin-Gab et al, "Ozone and Its Current and Future Application in the Food Industry", Advances in Food and Nutrition Research vol. 45, 2003, pp. 167-218.

Pflaumbaum, M. et al. "Rheological Properties of Acid Gel Cleansers", Colloids and Surfaces A: Physicochemical and Engineering Aspects, vols. 183-185, Jul. 15, 2001, pp. 777-784.

(Continued)

*Primary Examiner* — Zohreh A Fay
(74) *Attorney, Agent, or Firm* — McKee, Voorhees & Sease, PLC

(57) ABSTRACT

The present disclosure relates to rheology modified, low foaming aqueous antimicrobial compositions. The compositions are phase stable under acidic conditions, and do not need to be rinsed from the surface to which they are applied. The present disclosure further relates to methods of use thereof.

12 Claims, 1 Drawing Sheet

(56) References Cited

U.S. PATENT DOCUMENTS

| | | |
|---|---|---|
| 5,567,753 A | 10/1996 | Shuman et al. |
| 5,626,856 A | 5/1997 | Berndt |
| 5,639,466 A | 6/1997 | Ford et al. |
| 5,645,823 A | 7/1997 | Thrall et al. |
| 5,688,771 A | 11/1997 | Penney et al. |
| 5,716,628 A | 2/1998 | Vinopal et al. |
| 5,718,895 A | 2/1998 | Asgharian et al. |
| 5,723,418 A | 3/1998 | Person Hei et al. |
| 5,733,950 A | 3/1998 | Dunn et al. |
| 5,739,176 A | 4/1998 | Dunn et al. |
| 5,750,142 A | 5/1998 | Friedman et al. |
| 5,800,862 A | 9/1998 | Kaufmann et al. |
| 5,847,012 A | 12/1998 | Shalaby et al. |
| 5,854,266 A | 12/1998 | Nelson, Jr. |
| 5,863,874 A | 1/1999 | Person Hei et al. |
| 5,868,859 A | 2/1999 | Hei et al. |
| 5,888,533 A | 3/1999 | Dunn |
| 5,898,040 A | 4/1999 | Shalaby et al. |
| 5,900,445 A | 5/1999 | Chandler et al. |
| 5,916,581 A | 6/1999 | Foret et al. |
| 5,939,060 A | 8/1999 | Trinh et al. |
| 5,939,203 A | 8/1999 | Kappock et al. |
| 5,942,480 A | 8/1999 | Prevost et al. |
| 5,968,404 A | 10/1999 | Trinh et al. |
| 5,969,020 A | 10/1999 | Shalaby et al. |
| 5,980,375 A | 11/1999 | Anderson et al. |
| 6,001,343 A | 12/1999 | Trinh et al. |
| 6,010,993 A | 1/2000 | Romano et al. |
| 6,110,883 A | 8/2000 | Petri et al. |
| 6,113,815 A | 9/2000 | Elfersy et al. |
| 6,121,219 A | 9/2000 | Herdt |
| 6,136,885 A | 10/2000 | Rusin et al. |
| 6,139,646 A | 10/2000 | Asgharian et al. |
| 6,139,856 A | 10/2000 | Kaminska et al. |
| 6,180,584 B1 | 1/2001 | Sawan et al. |
| 6,183,757 B1 | 2/2001 | Beerse et al. |
| 6,183,763 B1 | 2/2001 | Beerse et al. |
| 6,203,812 B1 | 3/2001 | Ehrhard et al. |
| 6,217,887 B1 | 4/2001 | Beerse et al. |
| 6,218,348 B1 | 4/2001 | Aronson et al. |
| 6,235,692 B1 | 5/2001 | Scoville et al. |
| 6,235,820 B1 | 5/2001 | Lassila et al. |
| 6,242,526 B1 | 6/2001 | Siddiqui et al. |
| 6,258,342 B1 | 7/2001 | Harcum et al. |
| 6,281,170 B1 | 8/2001 | Marsella et al. |
| 6,313,182 B1 | 11/2001 | Lassila et al. |
| 6,319,526 B1 | 11/2001 | Dahlstrom et al. |
| 6,342,470 B1 | 1/2002 | Aronson et al. |
| 6,343,225 B1 | 1/2002 | Clark, Jr. |
| 6,369,146 B1 | 4/2002 | Lassila et al. |
| 6,379,685 B1 | 4/2002 | Richter et al. |
| 6,395,289 B1 | 5/2002 | Ehrhard et al. |
| 6,399,088 B1 | 6/2002 | Slone et al. |
| 6,399,543 B1 | 6/2002 | Meier et al. |
| 6,410,040 B1 | 6/2002 | Melrose et al. |
| 6,413,914 B1 | 7/2002 | Meier et al. |
| 6,416,751 B1 | 7/2002 | Roulier et al. |
| 6,417,151 B1 | 7/2002 | Grothus et al. |
| 6,429,220 B1 | 8/2002 | Yagi et al. |
| 6,436,444 B1 | 8/2002 | Richter et al. |
| 6,461,631 B1 | 10/2002 | Dunn et al. |
| 6,461,632 B1 | 10/2002 | Gogolewski |
| 6,463,766 B2 | 10/2002 | Kubota et al. |
| 6,440,442 B1 | 11/2002 | Ehrhard et al. |
| RE37,950 E | 12/2002 | Dunn et al. |
| 6,488,943 B1 | 12/2002 | Beerse et al. |
| 6,506,737 B1 | 1/2003 | Hei et al. |
| 6,506,803 B1 | 1/2003 | Baker et al. |
| 6,509,050 B1 | 1/2003 | Henson et al. |
| 6,511,962 B1 | 1/2003 | Borders et al. |
| 6,528,013 B1 | 3/2003 | Trinh et al. |
| 6,528,080 B2 | 3/2003 | Dunn et al. |
| 6,531,434 B1 | 3/2003 | Gluck |
| 6,531,519 B2 | 3/2003 | Patil |
| 6,534,075 B1 | 3/2003 | Hei et al. |
| 6,537,563 B2 | 3/2003 | Jia et al. |
| 6,537,577 B1 | 3/2003 | Siegel |
| 6,548,080 B1 | 4/2003 | Gertzman et al. |
| 6,573,102 B2 | 6/2003 | Li et al. |
| 6,585,814 B2 | 7/2003 | Slone et al. |
| 6,593,283 B2 | 7/2003 | Hei et al. |
| 6,604,531 B2 | 8/2003 | Nakamura et al. |
| 6,617,294 B2 | 9/2003 | Narula et al. |
| 6,630,121 B1 | 10/2003 | Sievers et al. |
| 6,645,507 B2 | 11/2003 | Bettle et al. |
| 6,653,263 B1 | 11/2003 | Kupper et al. |
| 6,656,458 B1 | 12/2003 | Philippe et al. |
| 6,656,923 B1 | 12/2003 | Trinh et al. |
| 6,699,825 B2 | 3/2004 | Rees et al. |
| 6,716,895 B1 | 4/2004 | Terry |
| 6,743,574 B1 | 6/2004 | Wolfinbarger, Jr. et al. |
| 6,749,869 B1 | 6/2004 | Richter et al. |
| 6,753,001 B2 | 6/2004 | Jia et al. |
| 6,762,172 B1 | 7/2004 | Elfersy et al. |
| 6,762,208 B2 | 7/2004 | Schwartz et al. |
| 6,777,003 B1 | 8/2004 | Desai |
| 6,784,145 B2 | 8/2004 | Delambre et al. |
| 6,809,068 B1 | 10/2004 | Kupper et al. |
| 6,824,802 B2 | 11/2004 | Bautista et al. |
| 6,828,294 B2 | 12/2004 | Kellar et al. |
| 6,867,233 B2 | 3/2005 | Roselle et al. |
| 6,929,705 B2 | 8/2005 | Myers et al. |
| 6,953,507 B2 | 10/2005 | Kravitz et al. |
| 6,962,608 B1 | 11/2005 | Sun et al. |
| 6,962,897 B2 | 11/2005 | Kupper et al. |
| 6,979,455 B2 | 12/2005 | Ong et al. |
| 6,991,685 B2 | 1/2006 | Kravitz et al. |
| 7,001,632 B2 | 2/2006 | Nauth et al. |
| 7,008,979 B2 | 3/2006 | Schottman et al. |
| 7,012,053 B1 | 3/2006 | Barnabas et al. |
| 7,014,843 B2 | 3/2006 | Parekh et al. |
| 7,067,499 B2 | 6/2006 | Erazo-Majewicz et al. |
| 7,094,448 B2 | 8/2006 | Ono et al. |
| 7,097,705 B2 | 8/2006 | Smith et al. |
| 7,097,850 B2 | 8/2006 | Chappa et al. |
| 7,112,630 B2 | 9/2006 | Lee et al. |
| 7,160,846 B2 | 1/2007 | Biering et al. |
| 7,196,117 B2 | 3/2007 | Betran et al. |
| 7,199,093 B2 | 4/2007 | Li et al. |
| 7,256,167 B2 | 8/2007 | Cheung et al. |
| 7,282,211 B2 | 10/2007 | Ping |
| 7,297,666 B2 | 11/2007 | Kupper et al. |
| 7,309,684 B2 | 12/2007 | Filippini et al. |
| 7,378,380 B2 | 5/2008 | Blagg et al. |
| 7,384,895 B2 | 6/2008 | Person Hei et al. |
| 7,417,000 B2 | 8/2008 | Barnabas et al. |
| 7,468,105 B2 | 12/2008 | Andreas |
| 7,470,656 B2 | 12/2008 | Sherry et al. |
| 7,491,753 B2 | 2/2009 | Krishnan |
| 7,507,699 B2 | 3/2009 | Burt et al. |
| 2002/0132742 A1 | 9/2002 | Mizuki |
| 2002/0155969 A1 | 10/2002 | Rees et al. |
| 2002/0169099 A1 | 11/2002 | Knox |
| 2002/0173545 A1 | 12/2002 | Gutzmann |
| 2003/0008917 A1 | 1/2003 | Brock et al. |
| 2003/0087786 A1 | 5/2003 | Hei et al. |
| 2004/0086546 A1 | 5/2004 | Maxwell |
| 2004/0157931 A1 | 8/2004 | Ra et al. |
| 2004/0183050 A1 | 9/2004 | Hei et al. |
| 2005/0129643 A1 | 6/2005 | Lepilleur |
| 2005/0153031 A1 | 7/2005 | Man et al. |
| 2005/0288204 A1 | 12/2005 | Matts et al. |
| 2006/0182690 A1 | 8/2006 | Veeger |
| 2006/0205619 A1 | 9/2006 | Mayhall |
| 2007/0020364 A1 | 1/2007 | Burnett et al. |
| 2007/0020365 A1 | 1/2007 | Herdt |
| 2007/0042094 A1 | 2/2007 | Warf, Jr. et al. |
| 2007/0048344 A1 | 3/2007 | Yahiaoui et al. |
| 2007/0134171 A1 | 6/2007 | Dodds |
| 2007/0297942 A1 | 12/2007 | Samadpour |
| 2008/0057136 A1 | 3/2008 | Polyakov |
| 2008/0075793 A1 | 3/2008 | Dunshee |
| 2008/0142023 A1 | 6/2008 | Schmid |
| 2008/0199562 A1 | 8/2008 | Hilgren et al. |

(56) References Cited

U.S. PATENT DOCUMENTS

| | | |
|---|---|---|
| 2008/0241269 A1 | 10/2008 | Velasquez |
| 2008/0268128 A1 | 10/2008 | Huber |
| 2008/0274242 A1 | 11/2008 | Gutzmann |
| 2008/0287538 A1 | 11/2008 | Scholz |
| 2008/0293825 A1 | 11/2008 | Littau |
| 2009/0041907 A1 | 2/2009 | Etayo Garralda |
| 2009/0068323 A1 | 3/2009 | Mussawire-Key |
| 2009/0202463 A1 | 8/2009 | Pan et al. |

OTHER PUBLICATIONS

Naik, S.C., et al., "Evaluation of Hydroxyethyl Cellulose Ether as a Thickener for Aqueous Lubricants or Hydraulic Fluids", Wear, vol. 50, Issue 1, Sep. 1978, pp. 155-168.

European Patent Office, "Extended European Search Report", issued in connection to Application No. 11783159.4-1375/2571383, dated Apr. 28, 2016, 6 pages.

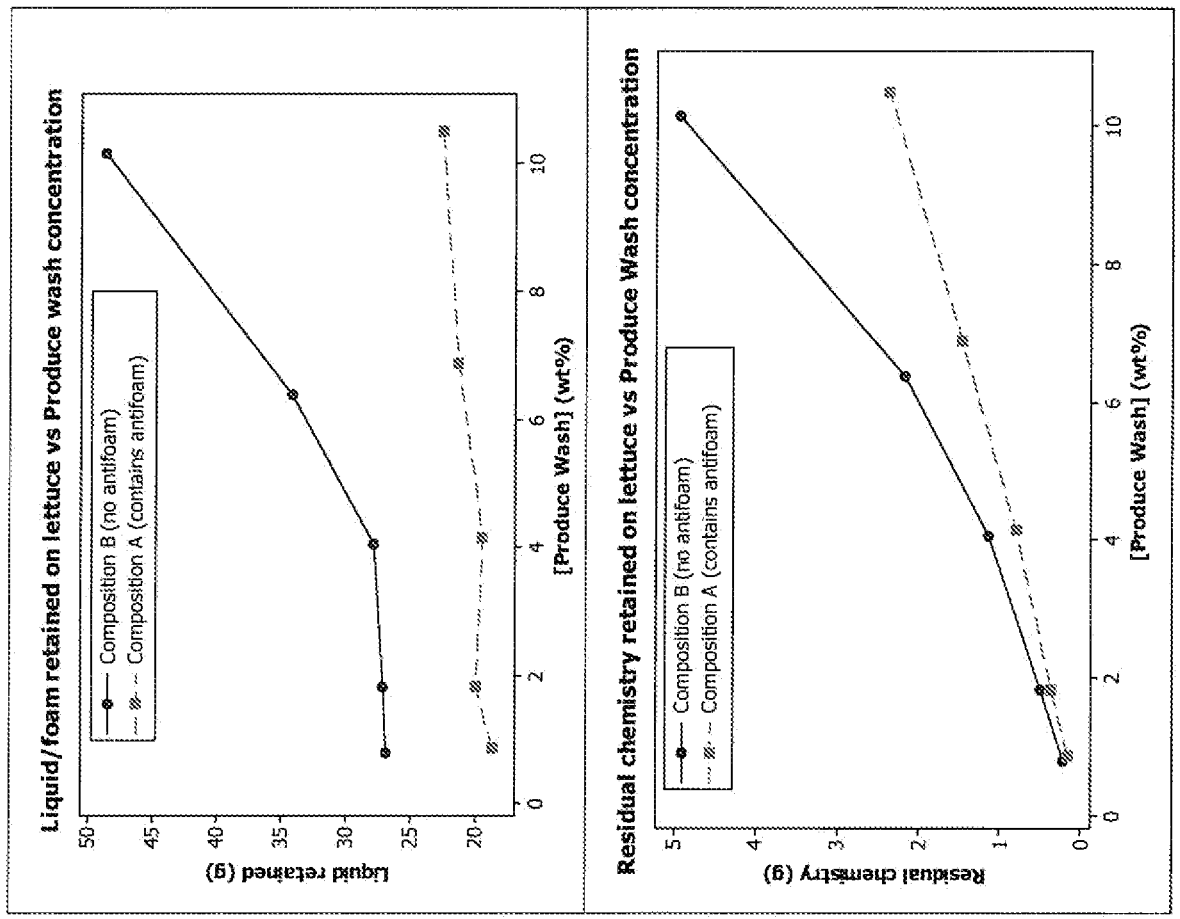

RHEOLOGY MODIFIED LOW FOAMING LIQUID ANTIMICROBIAL COMPOSITIONS AND METHODS OF USE THEREOF

RELATED APPLICATIONS

This application is related to U.S. Provisional Patent Application No. 61/346,804, filed May 20, 2009, entitled "Rheology Modified Low Foaming Liquid Antimicrobial Compositions and Methods of Use Thereof." The entire contents of this patent application are hereby expressly incorporated herein by reference including, without limitation, the specification, claims, and abstract, as well as any figures, tables, or drawings thereof.

FIELD

The present disclosure relates to aqueous low foaming antimicrobial compositions, and methods of use thereof.

BACKGROUND

During processing, preparation, packaging and serving, food products may encounter microorganisms that may make the food unsuitable for consumption. The microorganisms may come from the food itself, food contact surfaces, and/or the surrounding environment. The microorganisms can range from pathogenic microorganisms (e.g., *Listeria monocytogenes*, enterohemorrhagic *Escherichia coli, Salmonella* and the like) to spoilage organisms that can affect the taste, color, and/or smell of the final food product (e.g. *Pseudomonas* spp, *Erwinia carotovora, Fusarium* spp and the like). Microorganisms can affect a wide variety of food products including meat, poultry, fish and shellfish, cheese, fruits and vegetables, and pre-prepared foods. At certain levels, the presence of microorganisms on a food product may cause everything from a consumer's perception of a lower quality product, to regulatory investigations and sanctions, to food borne illness or death.

Food processors, grocery retailers, full service restaurants (FSR) and quick service restaurants (QSR) use a variety of methods to treat food products during processing to reduce the presence of microorganisms on food products. These methods include cleaning and sanitizing the food processing plant and food handling environment, applying or incorporating antimicrobials to or in the food product, irradiating the food product, applying heat, and others. Applying or incorporating an antimicrobial composition to the food product, or to the water used in washing or transporting the food product, is a preferred way of reducing microorganisms. However, it is difficult to formulate a composition that is effective at reducing microorganisms using ingredients that are acceptable for direct food contact according to government regulations. Further, it is difficult to formulate a composition that can be applied directly to a food product without adversely affecting the color, taste, or smell of the food product. Finally, many antimicrobials used in the treatment of food products in the retail grocery, FSR and QSR markets may have worker safety concerns, material compatibility (corrosion) concerns or must be generated onsite requiring more costly equipment to dispense and use the antimicrobial.

BRIEF SUMMARY OF THE INVENTION

In some aspects, the present disclosure relates to single phase aqueous low foaming antimicrobial concentrate compositions. The compositions comprise at least about 25 wt % water; an antimicrobial agent comprising an anionic surfactant; a defoaming agent; an acidulant; a stabilizing agent; and a thickening agent. The compositions have a viscosity of between about 50 centipoise and about 3500 centipoise, and the thickening agent is present in an amount effective such that the composition is phase stable under acidic conditions.

In some embodiments, the anionic surfactant is selected from the group consisting of alkyl sulfates, alkyl sulfonates, alkyl aryl sulfonates, sulfonated fatty acids, sulfonated fatty acid esters, sulfonated carboxylic acid esters, and mixtures thereof. In other embodiments, the composition is substantially free of a C5 to C11 carboxylic acid, a chlorite, and an oxidizing agent, and mixtures thereof.

In some embodiments, the defoaming agent comprises a silicone defoaming agent. In other embodiments, the thickening agent is selected from the group consisting of natural polysaccharide or cellulose thickeners, plant exudates, seaweed extracts, water soluble polymers, poly acrylic acid based thickeners, polyacrylamide based thickeners, inorganic clay based thickeners, and mixtures thereof.

In other embodiments, the acidulant comprises a food additive ingredient. In still yet other embodiments, the acidulant is selected from the group consisting of citric acid, sodium bisulfate, acetic acid, adipic acid, tartaric acid, propionic acid, malic acid, lactic acid, sulfuric acid, and derivatives and mixtures thereof. In some embodiments, the composition comprises: between about 0.01 wt % and about 50 wt % of the antimicrobial agent; between about 0.01 wt % and about 10.0 wt % defoaming agent; between about 0.1 wt % and about 10 wt % thickening agent; and between about 1 wt % to about 50 wt % of the acidulant.

In some embodiments, the composition has a pH of less than 3.2. In other embodiments, the composition further comprises an additional ingredient selected from the group consisting of a surfactant, a processing aid, a dye, a colorant, an odorant, and mixtures thereof. In still yet other embodiments, the composition comprises between about 0.1 wt % and about 5.0 wt % stabilizing agent.

In other embodiments, the stabilizing agent is present at an amount effect to prevent the formation of a precipitate for at least 24 hours when the composition is diluted with 500 ppm hard water. In still yet other embodiments, the stabilizing agent comprises a block copolymer of ethylene oxide and propylene oxide. In other embodiments, the copolymers have a molecular weight of about 5,000 to about 10,000 and the percentage of ethylene oxide is between about 70 to about 90.

In some aspects, the present disclosure relates to methods for reducing a population of microorganisms on a surface. The methods comprise providing a single phase aqueous low foaming antimicrobial concentrate composition. The composition comprises at least about 25 wt % water; an antimicrobial agent comprising an anionic surfactant; a defoaming agent; an acidulant selected from the group consisting of sulfates, sulfonates, and combinations thereof; a stabilizing agent; and a thickening agent. The composition has a viscosity of between about 50 centipoise and about 3500 centipoise, and the thickening agent is present in an amount effective such that the composition is phase stable under acidic conditions. The method further comprises diluting the composition; and contacting the surface with the diluted composition such that the population of microorganisms is reduced, wherein the composition does not need to be rinsed from the surface.

In some aspects, the present disclosure relates to methods for washing produce. The methods comprise contacting the produce with a phase stable aqueous acidic antimicrobial composition comprising at least about 25 wt % water; an antimicrobial agent comprising an anionic surfactant; a defoaming agent; an acidulant; a stabilizing agent; and a thickening agent. The composition is diluted prior to contacting, and has a viscosity of between about 50 centipoise and about 3500 centipoise, and the thickening agent is present in an amount effective such that the composition is phase stable under acidic conditions, and the produce does not need to be rinsed after being contacted by the composition.

BRIEF DESCRIPTION OF THE DRAWINGS

FIG. 1 is a graphical depiction of liquid retention and residual chemistry carryover onto lettuce versus produce wash concentration.

DETAILED DESCRIPTION OF THE INVENTION

In some aspects, the present disclosure relates to aqueous low foaming antimicrobial compositions, and methods of use thereof. The compositions are stable, single phase compositions that can be applied directly to food surfaces, and food contact surfaces, without the need to be rinsed. That is, the compositions can be applied directly to a food surface, e.g., fruit or vegetable surface, cutting board, and do not need to be rinsed off prior to consuming or using the surface. Further, the compositions do not substantially alter the organoleptic properties, e.g., color, texture, odor, or taste, of a food surface that they contact. Thus, the compositions provide a no-rinse method for cleaning food surfaces.

Definitions

So that the invention maybe more readily understood, certain terms are first defined. For the following defined terms, these definitions shall be applied, unless a different definition is given in the claims or elsewhere in this specification.

As used herein, the phrases "objectionable odor," "offensive odor," or "malodor," refer to a sharp, pungent, or acrid odor or atmospheric environment from which a typical person withdraws if they are able to. Hedonic tone provides a measure of the degree to which an odor is pleasant or unpleasant. An "objectionable odor," "offensive odor," or "malodor" has an hedonic tone rating it as unpleasant as or more unpleasant than a solution of 5 wt-% acetic acid, propionic acid, butyric acid, or mixtures thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the phrase "plant" or "plant product" includes any plant substance or plant-derived substance. Plant products include, but are not limited to, seeds, nuts, nut meats, cut flowers, plants or crops grown or stored in a greenhouse, house plants, and the like. Plant products include many animal feeds.

As used herein, the phrase "meat product" refers to all forms of animal flesh, including the carcass, muscle, fat, organs, skin, bones and body fluids and like components that form the animal. Animal flesh includes, but is not limited to, the flesh of mammals, birds, fishes, reptiles, amphibians, snails, clams, crustaceans, other edible species such as lobster, crab, etc., or other forms of seafood. The forms of animal flesh include, for example, the whole or part of animal flesh, alone or in combination with other ingredients. Typical forms include, for example, processed meats such as cured meats, sectioned and formed products, minced products, finely chopped products, ground meat and products including ground meat, whole products, and the like.

As used herein the term "poultry" refers to all forms of any bird kept, harvested, or domesticated for meat or eggs, and including chicken, turkey, ostrich, game hen, squab, guinea fowl, pheasant, quail, duck, goose, emu, or the like and the eggs of these birds. Poultry includes whole, sectioned, processed, cooked or raw poultry, and encompasses all forms of poultry flesh, by-products, and side products. The flesh of poultry includes muscle, fat, organs, skin, bones and body fluids and like components that form the animal. Forms of animal flesh include, for example, the whole or part of animal flesh, alone or in combination with other ingredients. Typical forms include, for example, processed poultry meat, such as cured poultry meat, sectioned and formed products, minced products, finely chopped products and whole products.

As used herein, the phrase "poultry debris" refers to any debris, residue, material, dirt, offal, poultry part, poultry waste, poultry viscera, poultry organ, fragments or combinations of such materials, and the like removed from a poultry carcass or portion during processing and that enters a waste stream.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

As used herein, the phrase "air streams" includes food anti-spoilage air circulation systems. Air streams also include air streams typically encountered in hospital, surgical, infirmity, birthing, mortuary, and clinical diagnosis rooms.

As used herein, the term "waters" includes food process or transport waters. Food process or transport waters include produce transport waters (e.g., as found in flumes, pipe transports, cutters, slicers, blanchers, retort systems, washers, misting equipment and the like), belt sprays for food transport lines, boot and hand-wash dip-pans, third-sink rinse waters, and the like. Waters also include domestic and recreational waters such as pools, spas, recreational flumes and water slides, fountains, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g., bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, "agricultural" or "veterinary" objects or surfaces include animal feeds, animal watering stations and enclosures, animal quarters, animal veterinarian clinics (e.g., surgical or treatment areas), animal surgical areas, and the like.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt %, and most preferably the amount of phosphorus is less than 0.01 wt %.

For the purpose of this patent application, successful microbial reduction is achieved when the microbial populations, e.g., microbial populations on surfaces or in water, are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, $25\pm2°$ C., against several test organisms.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used in this invention, the term "sporicide" refers to a physical or chemical agent or process having the ability to cause greater than a 90% reduction (1-log order reduction) in the population of spores of *Bacillus cereus* or *Bacillus subtilis* within 10 seconds at 60° C. In certain embodiments, the sporicidal compositions of the invention provide greater than a 99% reduction (2-log order reduction), greater than a 99.99% reduction (4-log order reduction), or greater than a 99.999% reduction (5-log order reduction) in such population within 10 seconds at 60° C.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbiostatic. A sanitizer and a disinfectant are, by definition, agents which provide antimicrobial or microbiocidal activity. In contrast, a preservative is generally described as an inhibitor or microbiostatic composition As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including hetero aromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Weight percent, percent by weight, % by weight, wt %, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4 and 5).

As used in this specification and the appended claims, the singular forms "a," "an," and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The use of the terms "antimicrobial" and "biocide" in this application does not mean that any resulting products are approved for use as an antimicrobial agent or biocide.

The compositions and methods disclosed herein may comprise, consist of, or consist essentially of the listed ingredients, or steps. As used herein the term "consisting essentially of" refers to a composition or method that includes the disclosed ingredients or steps, and any other ingredients or steps that do not materially affect the novel and basic characteristics of the compositions or methods. For example, compositions that consist essentially of the listed ingredients do not contain additional ingredients that would affect, for example, the antimicrobial or rheological properties of the compositions.

Compositions

The good detergency and broad biocidal efficacy of Generally Regarded As Safe (GRAS) listed anionic surfactants make them ideal to be used as active ingredients in a produce wash formula. However, the high foam profile of these surfactants makes it hard for them to be used in a convenient liquid form suitable for an automated dispensing system, such as an Oasis Pro aspirator dispenser available from Ecolab. Dispensing systems often generate large amounts of stable foam during the dispensing process from the concentrate form. The presence of foam is detrimental when used in a no rinse formulation, e.g., a no rinse produce wash formulation, as it not only impacts the visual appearance of the contacted surface, but it can also change the taste, odor, texture and appearance of the contacted surface, e.g., produce.

As a result, it is preferred to eliminate the foam in formulas employing such ingredients. Incorporation of an appropriate defoamer into the composition is one approach to eliminate foam. Indeed, some commercial antimicrobial produce wash products employing anionic surfactant as active ingredients do contain defoamer, such as silicon defoamer. However, these products are in the form of powder, making them much easier to formulate incorporating a defoamer. On the other hand, the silicon defoamer poses significant technical challenges when incorporated into a primarily aqueous liquid form, as these silicon particles tend to aggregate in the composition, and cause phase stability issues.

In some aspects, the present disclosure relates to single phase, aqueous, low foaming antimicrobial compositions. The compositions are rheology modified such that they remain as a single phase in liquid form, and are low or no foaming, even when agitated, e.g., dispensed through an aspirator, or applied in an agitated bath, e.g., flume waters. Further, the compositions do not need to be rinsed from the surface they contact prior to consumption or use.

The compositions include at least an antimicrobial agent, an acidulant, a defoaming agent, and a thickening agent. The compositions further include at least about 25 wt % water. The compositions are phase stable liquid compositions. That is, they are not solids, e.g., powders, tablets, granules, etc. In some embodiments, the compositions do not include oxidizing agents, chlorites, or mixtures thereof. Nor do the compositions include volatile solvents, e.g., monohydric alcohol volatile solvents.

Antimicrobial Agents

In some aspects, the compositions include an antimicrobial agent. In some embodiments, the antimicrobial agents suitable for use with the compositions of the invention are GRAS antimicrobial agents or food grade compositions.

In some embodiments, the antimicrobial agent is selected from the group consisting of anionic surfactants, quaternary ammonium compounds and mixtures thereof. In some embodiments, the compositions can include more than one antimicrobial agent. For example, in some embodiments, the compositions can include one, two, three or four antimicrobial agents.

In some embodiments, the compositions include an anionic surfactant as an antimicrobial agent. The anionic surfactant can include, but is not limited to, sulfates, sulfonates, and combinations thereof. Exemplary anionic surfactants for use with the present compositions include alkyl sulfates, alkyl sulfonates, alkyl aryl sulfonates, sulfonated fatty acids, sulfonated fatty acid esters, sulfonated carboxylic acid esters, and mixtures thereof. Sulfonated fatty acids suitable for use include, but are not limited to, sulfonated oleic acid, sulfonated linoleic acid, sulfonated palmitoleic acid and sulfonated stearic acid.

Additional exemplary antimicrobial agents include, but are not limited to, sodium dodecylbenzene sulfonate, sodium dodecyl sulfate, sodium dioctyl sulfosuccinate, sulfonated oleic acid, α-sulfonated carboxylic acid, dialkyl dimethyl ammonium chloride, alkylbenzyldimethyl ammonium chloride and combinations thereof. In some embodiments, the compositions are free or substantially free of a chlorite and/or an oxidizing agent.

In some embodiments, the compositions include between about 0.01 to about 20 wt % of one or more antimicrobial agent, about 0.01 wt % to about 10 wt % of one or more antimicrobial agent, or about 1.0 wt % to about 5 wt % of one or more antimicrobial agent. It is to be understood that all values and ranges between these values and ranges are included in the present disclosure.

Defoaming Agents

The compositions further include a defoaming agent. In some embodiments, the compositions can include defoamers which are of food grade quality. To this end, silicones can be used as effective defoaming agents. The compositions are designed such that silicones can be incorporated as defoaming agents even though the compositions are in liquid form. Silicones such as dimethyl silicone, glycol polysiloxane, methylphenol polysiloxane, trialkyl or tetralkyl silanes, hydrophobic silica defoamers and mixtures thereof can all be used as defoamers in the compositions. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 commercially available from Dow Corning Corporation. Other additional defoaming agents suitable for use with the compositions include, but are not limited to, FG10, and 1520, commercially available from Dow Corning Corporation, and Hodag FD-82K, commercially available from Lambent. A defoaming agent can be present at a concentration range from about 0.01 wt % to 20 wt %, from about 0.1 wt % to 10 wt %, or from about 0.01 wt % to about 2 wt %. In some embodiments, the compositions include more than zero but less than 1 wt % defoaming agent. It is to be understood that all values and ranges between these values and ranges are incorporated in the present disclosure.

Acidulants

In some embodiments, the compositions include an acidulant. The acidulant can be present at an amount effective to form a concentrate composition with pH of about 1 or less. In other embodiments, the acidulant can be present at an amount effective to form a use composition with pH of about 5, about 5 or less, about 4, about 4 or less, about 3, about 3 or less, about 2, about 2 or less, or the like. In some embodiments, the composition has a pH of between about 0 to about 6, about 1 to about 5, or about 2 to about 4. In other embodiments, the composition has a pH of less than about 3.2.

In some embodiments, the acidulant includes an inorganic acid. Suitable inorganic acids include, but are not limited to, sulfuric acid, sodium bisulfate, phosphoric acid, nitric acid, hydrochloric acid, and mixtures thereof. In some embodiments, the acidulant includes an organic acid. Suitable organic acids include, but are not limited to, methane sulfonic acid, ethane sulfonic acid, propane sulfonic acid, butane sulfonic acid, xylene sulfonic acid, benzene sulfonic acid, formic acid, acetic acid, mono, di, or tri-halocarboyxlic acids, picolinic acid, dipicolinic acid, levulinic acid and mixtures thereof. In some embodiments, the compositions of the present invention are free or substantially free of a phosphorous based acid.

The compositions may also include a carboxylic acid. In some embodiments, the carboxylic acid includes, but is not limited to, an alpha hydroxy carboxylic acid, sulfonated carboxylic acids, and mixtures thereof. As used herein, the term "alpha hydroxy carboxylic acid" refers to chemical compounds that include a carboxylic acid substituted with a hydroxyl group on the adjacent carbon. Alpha hydroxy carboxylic acids include, for example, glycolic acid, lactic acid, malic acid, citric acid and tartaric acid.

In some embodiments, the carboxylic acid for use with the compositions of the present invention includes a C1 to C22 carboxylic acid. In some embodiments, the carboxylic acid for use with the compositions is a C5 to C11 carboxylic acid. In some embodiments, the carboxylic acid for use with the compositions is a C1 to C4 carboxylic acid. Examples of suitable carboxylic acids include, but are not limited to, formic, acetic, propionic, butanoic, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and mixtures thereof. In some embodiments, the composition is substantially free, or free of a C5 to C11 carboxylic acid. In other embodiments, the composition is substantially free, or free of a C1 to C4 carboxylic acid. In some embodiments, the composition is substantially free, or free of both a C1 to C4 carboxylic acid, and a C5 to C11 carboxylic acid.

In some embodiments, the compositions include more than one acidulant. For example, in some embodiments, the compositions include one, two, three or four acidulants.

In some embodiments, the acidulant selected can also function as a stabilizing agent. Thus, the compositions of the present invention can be substantially free of an additional stabilizing agent.

In certain embodiments, the present composition includes about 0.5 to about 80 wt-% acidulant, about 1 to about 50 wt %, about 5 to about 30 wt-% acidulant, or about 10 wt % to about 30 wt-% acidulant. It is to be understood that all values and ranges between these values and ranges are encompassed by the compositions disclosed herein.

Stabilizing Agent

In some embodiments, the compositions also include a stabilizing agent. In some embodiments, the stabilizing agent is a food grade or GRAS stabilizing agent. The stabilizing agents aid in maintaining stability of the compositions. For example, in some embodiments, the stabilizing agents aid in maintaining the stability of the compositions in hard water. In some embodiments, the stabilizing agent is present at an amount effect to prevent the formation of a precipitate for at least 24 hours when the composition is diluted with 500 ppm hard water.

Any of a variety of stabilizing agents can be used in the disclosed compositions. In some embodiments, the stabilizing agent includes an ethylene oxide/propylene oxide block copolymer, mixtures thereof, or the like. In some embodiments, the copolymers have a molecular weight of about 5000 to about 10,000 and the percentage of ethylene oxide is between about 70 to about 90. Suitable ethylene oxide/propylene oxide block copolymers include for example, those sold under the Pluronic tradename (e.g., Pluronic F108 and Pluronic F68) and commercially available from BASF Corporation. Other exemplary stabilizers for use in the present invention include nonionic surfactants and emulsifiers, for example, polysorbate 80.

In some embodiments, one or more stabilizing agent may be present. In some embodiments, the stabilizing agent is present at between about 0.1 wt % and about 5.0 wt % of the composition. In other embodiments, the stabilizing agent is present between about 0.1 wt % and about 1.0 wt %. It is to be understood that all values and ranges between these values and ranges are encompassed by the present disclosure.

Thickening Agents

The compositions also include a thickening agent. The thickening agents may be food grade or GRAS. The thickening agents increase the viscosity of the compositions, and allow for the incorporation of a defoaming agent into the compositions under acidic conditions. That is, the thickening agent is present at an amount effective to maintain a phase stable composition when the defoaming agent is present.

In some embodiments, the thickening agent is selected from the group consisting of natural polysaccharide or cellulose thickeners, plant exudates, seaweed extracts, water soluble polymers, polyacrylic acid based thickeners, polyacrylamide based thickeners, inorganic clay based thickeners, and mixtures thereof. Natural polysaccharide or cellulose thickeners include, but are not limited to, guar gum, locust bean gum, xanthan gum, pectin, and gellan gum. Plant exudates include, but are not limited to, acacia, ghatti, and tragacanth. Seaweed extracts include, but are not limited to, sodium alginate, and sodium carrageenan. Suitable polymers include, but are not limited to, hydroxyethyl cellulose, hydroxypropyl cellulose, hydroxypropyl methylcelluse, and dextrans.

In some embodiments, the composition has a viscosity of between about 50 centipoise and about 3,500 centipoise when tested with spindle 3 at 50 rpm on a Brookfield RVDVI+ viscometer, and the thickening agent is present in an amount effective such that the composition is phase stable under acidic conditions. In other embodiments, the composition includes between about 0.1 wt % and about 10 wt % thickening agent. In other embodiments, the composition includes less than about 1.0 wt % of a thickening agent.

Carrier

In some embodiments, the compositions include a carrier. The carrier provides a medium which dissolves, suspends, or carries the other components of the composition. The carrier concentration and type will depend upon the nature of the composition as a whole, the environmental storage, and method of application including concentration of the antimicrobial agent, among other factors. Notably the carrier should be chosen and used at a concentration which does not inhibit the antimicrobial efficacy of the active agent in the composition of the invention. When used to wash a food contact surface, viz. produce, the carrier selected should be one that would not adversely affect the food contact surface.

In some embodiments, the carrier includes water. In some embodiments, the carrier does not include volatile solvents. For example, in some embodiments, the compositions do not include volatile monohydric alcohol solvents, including, but not limited to, aliphatic alcohols or a glycol ether.

The carrier can be included in the compositions at a concentration of at least about 25 wt %, at least 25 wt %, at least about 50 wt %, at least 50 wt %, from about 20 wt % to about 90 wt %, or from about 40 wt % to about 70 wt %. It is to be understood that all values and ranges between these values and ranges are to be encompassed by the present disclosure.

Dye

In some embodiments, the compositions include one or more dyes. The dyes can be food grade or GRAS dyes. The dyes aid in providing evidence that the antimicrobial composition is present in the treatment solution, e.g., in the sink or wash water. The dyes for use with the compositions must be stable at a low pH, e.g., pH less than about 2. Dyes suitable for use with the disclosed compositions include, but are not limited to FD&C Green 3, FD& C Yellow 5, and mixtures thereof.

If included, a dye is present at an amount effective to be visible when the composition is diluted to use level. In some embodiments, the dye is present at between about 0.0001 wt % and about 1.0 wt %, or between about 0.001 wt % and about 0.01 wt %. It is to be understood that all values and ranges between these values and ranges are encompassed by the present disclosure.

Additional Ingredients

The compositions of the invention can include additional ingredients. The additional ingredients can include, but are not limited to, a surfactant, a processing aid, a colorant, an odorant, an anti-browning agent and mixtures thereof.

Use Compositions and Methods of Use Thereof

The compositions include concentrate compositions and use compositions. For example, a concentrate composition can be diluted, for example with water, to form a use composition. In an embodiment, a concentrate composition can be diluted to a use solution before to application to an object. For reasons of economics, the concentrate can be marketed and an end user can dilute the concentrate with water or an aqueous diluent to a use solution. In other embodiments, a use composition can include about 0.01 to about 10 wt % of a concentrate composition and about 90 to about 99.99 wt % diluent; or about 0.1 to about 2 wt % of a concentrate composition and about 98 to about 99.9 wt-% diluent.

In some embodiments, the compositions are diluted with water. The compositions can be diluted at a ratio of between about 1:1 to about 1:512. In other embodiments, the compositions can be diluted at a ratio of between about 1:64 to about 1:256. The dilution ratio can vary depending on the diluent being used.

In some aspects, the present disclosure includes methods of using the disclosed antimicrobial compositions. For example, the methods include a method for reducing a microbial population, a method for reducing the population of a microorganism on skin, a method for treating a disease of skin, and/or a method for reducing an odor. These methods can operate on an article, surface, in a body or stream of water or a gas, or the like, by contacting the article, surface, body, or stream with a composition. Contacting can include any of numerous methods for applying composition, such as spraying the compositions, immersing the article in the compositions or a combination thereof.

In some aspects, the methods include a composition present at an amount effective for killing one or more of the food-borne pathogenic bacteria associated with a food product, including, but not limited to, *Salmonella typhimurium, Salmonella javiana, Salmonella enterica, Campylobacter jejuni, Listeria monocytogenes,* and *Escherichia coli* O157: H7, yeast, and mold. In some embodiments, the methods include applying compositions at an amount effective for killing one or more of the pathogenic bacteria associated with a health care surfaces and environments including, but not limited to, *Salmonella typhimurium, Staphylococcus aureus,* methicilin resistant *Staphylococcus aureus, Salmonella choleraesurus, Pseudomonas aeruginosa, Escherichia coli,* mycobacteria, yeast, and mold. The compositions have activity against a wide variety of microorganisms such as Gram positive (for example, *Listeria monocytogenes* or *Staphylococcus aureus*) and Gram negative (for example, *Escherichia coli* or *Pseudomonas aeruginosa*) bacteria, yeast, molds, bacterial spores, viruses, etc. The compositions of the present invention, as described above, have activity against a wide variety of human pathogens. The present compositions can kill a wide variety of microorganisms on a food processing surface, on the surface of a food product, in water used for washing or processing of food product, on a health care surface, or in a health care environment.

The compositions can be applied in a variety of areas including kitchens, bathrooms, factories, hospitals, dental offices and food plants, and can be applied to a variety of hard or soft surfaces having smooth, irregular or porous topography. Suitable hard surfaces include, for example, architectural surfaces (e.g., floors, walls, windows, sinks, tables, counters and signs); eating utensils; hard-surface medical or surgical instruments and devices; and hard-surface packaging. Such hard surfaces can be made from a variety of materials including, for example, ceramic, metal, glass, wood or hard plastic. Suitable soft surfaces include, for example paper; filter media; hospital and surgical linens and garments; soft-surface medical or surgical instruments and devices; and soft-surface packaging. Such soft surfaces can be made from a variety of materials including, for example, paper, fiber, woven or nonwoven fabric, soft plastics and elastomers. The compositions can also be applied to soft surfaces such as food and skin (e.g., a hand). The compositions can be included in products such as sterilants, sanitizers, disinfectants, preservatives, deodorizers, antiseptics, fungicides, germicides, sporicides, virucides, detergents, bleaches, hard surface cleaners.

The compositions can also be used in veterinary products such as mammalian skin treatments or in products for sanitizing or disinfecting animal enclosures, pens, watering stations, and veterinary treatment areas such as inspection tables and operation rooms. The present compositions can be employed in an antimicrobial foot bath for livestock or people.

In some aspects, the compositions can be employed for reducing the population of pathogenic microorganisms, such as pathogens of humans, animals, and the like. The compositions exhibit activity against pathogens including fungi, molds, bacteria, spores, and viruses, for example, *S. aureus, E. coli, Streptococci, Legionella, Pseudomonas aeruginosa,* mycobacteria, tuberculosis, phages, or the like. Such pathogens can cause a variety of diseases and disorders, including mastitis or other mammalian milking diseases, tuberculosis, and the like. The compositions can reduce the population of microorganisms on skin or other external or mucosal surfaces of an animal. In addition, the present compositions can kill pathogenic microorganisms that spread through transfer by water, air, or a surface substrate. The compositions need only be applied to the skin, other external or mucosal surfaces of an animal water, air, or surface.

The antimicrobial compositions can also be used on foods and plant species to reduce surface microbial populations; used at manufacturing or processing sites handling such foods and plant species; or used to treat process waters around such sites. For example, the compositions can be used on food transport lines (e.g., as belt sprays); boot and hand-wash dip-pans; food storage facilities; anti-spoilage air circulation systems; refrigeration and cooler equipment; beverage chillers and warmers, blanchers, cutting boards, third sink areas, and meat chillers or scalding devices. The compositions can be used to treat produce transport waters such as those found in flumes, pipe transports, cutters, slicers, blanchers, retort systems, washers, and the like. Particular foodstuffs that can be treated with compositions of the invention include eggs, meats, seeds, leaves, fruits and vegetables. Particular plant surfaces include both harvested and growing leaves, roots, seeds, skins or shells, stems, stalks, tubers, corms, fruit, and the like. The compositions may also be used to treat animal carcasses to reduce both pathogenic and non-pathogenic microbial levels.

The compositions can also be employed by dipping food processing equipment into the use solution, soaking the equipment for a time sufficient to sanitize the equipment, and wiping or draining excess solution off the equipment, The compositions may be further employed by spraying or wiping food processing surfaces with the use solution, keeping the surfaces wet for a time sufficient to sanitize the surfaces, and removing excess solution by wiping, draining vertically, vacuuming, etc.

The compositions may also be used in a method of sanitizing hard surfaces such as institutional type equipment, utensils, dishes, health care equipment or tools, and other hard surfaces. The antimicrobial compositions can be applied to microbes or to soiled or cleaned surfaces using a variety of methods. These methods can operate on an object, surface, in a body or stream of water or a gas, or the like, by contacting the object, surface, body, or stream with a compound of the invention. Contacting can include any of numerous methods for applying a compound, such as spraying the compound, immersing the object in the compound, or a combination thereof.

A concentrate or use concentration of a composition can be applied to or brought into contact with an object by any conventional method or apparatus for applying an antimicrobial or cleaning compound to an object. For example, the object can be wiped with, sprayed with, foamed on, and/or immersed in the compound, or a use solution made from the composition. The composition can be sprayed, foamed, or wiped onto a surface; the composition can be caused to flow over the surface, or the surface can be dipped into the composition. Contacting can be manual or by machine.

Methods for Contacting a Food Product

In some aspects, the present disclosure provides methods for contacting a food product with an antimicrobial composition employing any method or apparatus suitable for applying such a composition. Contacting the food product can occur in any location in which the food product might be found, such as field, processing site or plant, vehicle, warehouse, store, restaurant, or home. These same methods can also be adapted to apply the compositions to other objects.

The present methods require a certain minimal contact time of the composition with food product for occurrence of significant antimicrobial effect. The contact time can vary with concentration of the use composition, method of applying the use composition, temperature of the use composition, amount of soil on the food product, number of microorganisms on the food product, type of antimicrobial agent, or the like. The exposure time can be at least about 5 to about 15 seconds. In some embodiments, the exposure time is about 15 to about 30 seconds. In other embodiments, the exposure time is at least about 30 seconds. In still yet other embodiments, the exposure time is about one minute, about two minutes, or about four minutes.

In other embodiments, the exposure time is the amount of time it takes for the composition to dry on the contacted surface. For example the treated surface may be exposed to the compositions for about 20 to about 60 minutes, or about 30 to about 45 minutes.

In some embodiments, the method for washing a food product employs a pressure spray including the disclosed compositions. During application of the spray solution on the food product, the surface of the food product can be moved with mechanical action, e.g., agitated, rubbed, brushed, etc. Agitation can be by physical scrubbing of the food product, through the action of the spray solution under pressure, through sonication, or by other methods. In some embodiments, the agitation occurs in a sink, e.g., a Power-Soak® sink. Agitation increases the efficacy of the spray solution in killing micro-organisms, perhaps due to better exposure of the solution into the crevasses or small colonies containing the micro-organisms. Further, the compositions are formulated such that despite high agitation, they remain low to no foaming.

The spray solution, before application, can also be heated to a temperature of about 15 to 20° C., for example, about 20 to 60° C. to increase efficacy. The spray stabilized composition can be left on the food product for a sufficient amount of time to suitably reduce the population of micro-organisms, and then rinsed, drained, or evaporated off the food product.

Application of the material by spray can be accomplished using a manual spray wand application, an automatic spray of food product moving along a production line using multiple spray heads to ensure complete contact, or other spray apparatus. One automatic spray application involves the use of a spray booth. The spray booth substantially confines the sprayed compound to within the booth. The production line moves the food product through the entryway into the spray booth in which the food product is sprayed on all its exterior surfaces with sprays within the booth. After a complete coverage of the material and drainage of the material from the food product within the booth, the food product can then exit the booth. The spray booth can include steam jets that can be used to apply the stabilized compositions of the invention. These steam jets can be used in combination with cooling water to ensure that the treatment reaching the food product surface is less than 65° C., e.g., less than 60° C. The temperature of the spray on the food product is important to ensure that the food product is not substantially altered (cooked) by the temperature of the spray. The spray pattern can be virtually any useful spray pattern.

Immersing a food product in a liquid composition can be accomplished by any of a variety of methods known to those of skill in the art. For example, the food product can be placed into a tank or bath containing the stabilized composition. Alternatively, the food product can be transported or processed in a flume of the stabilized composition. The washing solution can be agitated to increase the efficacy of the solution and the speed at which the solution reduces micro-organisms accompanying the food product. Agitation can be obtained by conventional methods, including ultrasonics, aeration by bubbling air through the solution, by mechanical methods, such as strainers, paddles, brushes, pump driven liquid jets, or by combinations of these methods. The washing solution can be heated to increase the efficacy of the solution in killing micro-organisms. After the food product has been immersed for a time sufficient for the desired antimicrobial effect, the food product can be removed from the bath or flume and the stabilized composition can be rinsed, drained, or evaporated off the food product.

The following examples are provided for the purpose of illustration, not limitation.

EXAMPLES

Example 1

A test was performed to evaluate the impact of the addition of a defoaming agent to an exemplary produce wash formulation. Three formulations were tested. Compositions A and B were prepared in accordance with embodiments of the present disclosure. Compositions A and B are shown in the table below.

| Agent | Composition A | Composition B |
|---|---|---|
| Anionic Surfactant | 6.84 | 6.84 |
| C5-C11 Carboxylic Acid | 1.00 | 1.00 |
| Defoaming Agent | 0.50 | 0.00 |
| Lactic Acid | 19.65 | 19.65 |
| Thickening Agent | 0.40 | 0.40 |
| Processing Aid | 1.20 | 1.20 |
| Stabilizing Agent | 0.64 | 0.64 |
| Miscellaneous | 0.055 | 0.055 |
| DI Water | To 100 | To 100 |

Composition A also included a defoaming agent. Composition B included the same antimicrobial composition as included in Composition A, but did not include a defoaming agent. Comparative Composition 1 included a commercially available produce wash, Fit® Fruit and Produce Wash, commercially available from HealthPro Brands, Inc.

Each composition was diluted to a ratio of 1 ounce of produce wash to 1 gallon of water (5 grain). Then 40 milliliters (mL) of each of the diluted solutions was added to a 250 mL graduated cylinder. The samples were then spun on a foam test machine for 4 minutes. The samples were removed from the machine and the foam height was immediately recorded. The graduated cylinders were also immediately photographed. The change in foam height after two minutes was also measured. The test was then repeated 2 more times. The results from this test are shown in the table below.

TABLE 1

| Composition | Replicate | Foam Height (mL) | |
|---|---|---|---|
| | | Time = 10 seconds | Time = 120 seconds |
| Composition A | 1 | 0 | 0 |
| | 2 | 0 | 0 |
| | 3 | 0 | 0 |

TABLE 1-continued

| | | Foam Height (mL) | |
|---|---|---|---|
| Composition | Replicate | Time = 10 seconds | Time = 120 seconds |
| Composition B | 1 | 71 | 66 |
| | 2 | 76 | 71 |
| | 3 | 71 | 66 |
| Comparative Composition 1 | 1 | 21 | 16 |
| | 2 | 26 | 16 |
| | 3 | 21 | 16 |

As can be seen from these results, Composition A, which included a defoamer, had no foam present at either time point tested. Composition B, which included the same produce wash as Composition A, but did not include a defoamer had a very high and very stable foam. The commercially available composition tested, Comparative Composition 1 also formed a stable foam, however, it was not as high as the foam formed from Composition B. Overall, it was shown that the presence of a defoamer was important for reducing the foam height and stability in compositions in accordance with embodiments of the present invention.

Example 2

A study using Compositions A and B, as described above in Example 1, was run to evaluate the carryover of residual chemistry onto lettuce as a function of the foam level and the concentration of various produce washes in accordance with the present invention.

For this study, Dole brand cut and prepackaged romaine lettuce hearts were used. The lettuce was weighed and placed in a strainer and the vessel was filled with six liters (L) of either Composition A or B. The compositions were dispensed into the vessel using an Oasis® Cleaning System, commercially available from Ecolab Inc. The dispense time was 35 seconds, at a flow rate of approximately 10.3 liters/minute.

Thirty seconds after the composition was applied, a picture was taken of the foam and the strainer was removed from the liquid. The strainer was allowed to drain for 30 seconds and another photo was taken to visually document the amount of foam present. The lettuce was then transferred by hand to a plastic zip-lock bag, and weighed. The initial weight of the bag was 11.6 grams.

This procedure was repeated using varying sized dispenser aspirator tips to change the composition concentration, and the produce usage and residual carryover weights were recorded. The results from this study are shown in the table below and in FIG. 1.

TABLE 2

| Sample | Antifoam (Y/N) | Weight percent of Composition (wt %) | Liquid retained on lettuce (g) | Residual chemistry (g) |
|---|---|---|---|---|
| | | Composition B | | |
| 1 | N | 0.78% | 26.85 | 0.21 |
| 2 | N | 1.81% | 27.18 | 0.49 |
| 3 | N | 4.05% | 27.91 | 1.13 |
| 4 | N | 6.39% | 34.16 | 2.18 |
| 5 | N | 10.15% | 48.74 | 4.95 |
| | | Composition A | | |
| 6 | Y | 0.86% | 18.7 | 0.16 |
| 7 | Y | 1.81% | 20.01 | 0.36 |
| 8 | Y | 4.15% | 19.47 | 0.81 |
| 9 | Y | 6.88% | 21.37 | 1.47 |
| 10 | Y | 10.50% | 22.65 | 2.38 |

The results indicate that compositions that generate foam during washing or processing can carryover significantly more liquid/foam and residual chemistry than compositions that do not generate significant amounts of foam. The inclusion of antifoam to Composition A resulted in minimal foam generation and much less carryover of residual chemistry than the control Composition B prepared without an antifoaming agent.

Example 3

A study was performed to measure the ability of an antimicrobial produce wash composition in accordance with embodiments of the present disclosure to reduce *Listeria monocytogenes*, *Escherichia coli* O157:H7 and *Salmonella enterica* in processing waters for fruit and vegetables. The formula of the produce wash is also shown in the table below.

TABLE 3

| Produce Wash | |
|---|---|
| Composition | Amount (weight %) |
| DI Water | 67.95 |
| Anionic Surfactant | 1.37 |
| Combination of Acidulants | 26.32 |
| Stabilizing Agent | 3.06 |
| Thickening Agent | 0.70 |
| Defoaming agent | 0.60 |

The produce wash composition was tested against three different test systems. Test System 1 included a *Listeria monocytogenes* mixture that included: *L. monocytogenes* ATCC 49594, *L. monocytogenes* ATCC 19114, and *L. monocytogenes* ATCC 19116. Test System 2 included a *Escherichia coli* O157:H7 mixture that included *E. coli* O157:H7 ATCC 43895, *E. coli* O157:H7 ATCC 35150, and *E. coli* O157:H7 ATCC 43890. Test System 3 included a *Salmonella enterica* mixture that included *S. enterica* subsp. *enterica* ATCC 10721, *S. enterica* subsp. *enterica* ATCC 6962, and *S. enterica* subsp. *enterica* ATCC 13311.

For this study, the produce wash was diluted to various concentrations using varying diluents, as shown in the table below.

TABLE 4

| Test Substance | Desired Concentration | Diluent | Test Solution (Volume of Test Substance/ Total Volume) | pH |
|---|---|---|---|---|
| Produce Wash | 1:171 | 405 ppm Synthetic Hard Water (pH 7.90) | 4.68 g/800.02 g | 2.82 |
| | 1:143 | | 5.59 g/800.06 g | 2.74 |
| Produce Wash | 1:256 | 410 ppm Synthetic Hard Water (pH 7.89) | 2.0 g/500 g | 3.07 |

TABLE 4-continued

| Test Substance | Desired Concentration | Diluent | Test Solution (Volume of Test Substance/Total Volume) | pH |
|---|---|---|---|---|
| Produce Wash | 1:256 | 200 ppm Synthetic Hard Water (pH 7.89) | 3.9 g/1000 g | 3.12 |
|  |  | 400 ppm Synthetic Hard Water (pH 7.89) |  | 3.10 |
| Produce Wash | 1:128 | Sterile MilliQ Water (DI Water) | 1.17 g/300 g | 2.77 |
|  | 1:192 |  | 1.56 g/300 g | 2.67 |
|  | 1:256 |  | 2.34 g/300 g | 2.55 |
|  | 1:128 | 210 ppm Synthetic Hard Water (pH 7.95) | 1.17 g/300 g | 3.18 |
|  | 1:192 |  | 1.56 g/300 g | 2.94 |
|  | 1:256 |  | 2.34 g/300 g | 2.72 |
|  | 1:128 | 420 ppm Synthetic Hard Water (pH 7.91) | 1.17 g/300 g | 3.03 |
|  | 1:192 |  | 1.56 g/300 g | 2.87 |
|  | 1:256 |  | 2.34 g/300 g | 2.67 |
| Produce Wash | 1:200 | 200 ppm Synthetic Hard Water (pH 7.85) | 3.5 g/700 g | 2.95 |
|  | 1:220 |  | 3.18 g/700 g | 2.95 |
|  | 1:200 | 410 ppm Synthetic Hard Water (pH 7.83) | 3.5 g/700 g | 3.03 |
|  | 1:220 |  | 3.18 g/700 g | 3.01 |

For this study, 99 mL of the selected test substance (produce wash dilution) was dispensed into a sterile 250 mL Erlenmeyer flask. Duplicate flasks with 99 mL of sterile phosphate buffered dilution water (PBDW) were also prepared for determination of the inoculum populations. The test flasks were vigorously swirled. While the liquid in the flask was still in motion, the tip of a pipette containing 1 mL of the selected Test System suspension was immersed in the test substance midway between the center and the edge of the flask. One (1) mL of the Test System suspension was dispensed into 99 mL of the test substance (produce wash dilution).

After the selected exposure time, 1 mL of the test substance mixture was transferred into 9 mL of an inactivating agent using a sterile pipette and vortex to mix. This tube was considered to contain a $10^{-1}$ dilution of the test solution. For the test substance use solution test samples, 1 mL and 0.1 mL from the $10^{-1}$ inactivating agent tube were plated. For the inoculum population tests, a $10^{-5}$ and a $10^{-7}$ dilution in PBDW were prepared. 1 mL and 0.1 mL from these dilutions were plated. The plates were inverted and allowed to incubate at 35±2° C. for 48±4 hours. The results from this study are shown in the tables below.

TABLE 5

Inoculum Numbers

| Test System | CFU/mL | $Log_{10}$ Growth | Average $Log_{10}$ Growth |
|---|---|---|---|
| Listeria monocytogenes mixture | $118 \times 10^6$, $121 \times 10^6$ | 8.07, 8.08 | 8.08 |
| Escherichia coli O157:H7 mixture | $141 \times 10^6$, $146 \times 10^6$ | 8.15, 8.04 | 8.10 |
| Salmonella enterica mixture | $116 \times 10^6$, $102 \times 10^6$ | 8.06, 8.01 | 8.04 |

TABLE 6

Listeria monocytogenes Mixture

| Test Substance | Exposure Time | Survivors (CFU/mL) | $Log_{10}$ Survivors | Average $Log_{10}$ Survivors | Log Reduction |
|---|---|---|---|---|---|
| 1:171 in 400 ppm hard water | 90 sec | $0 \times 10^1$, $0 \times 10^1$ | <1.00, <1.00 | <1.00 | >7.08 |
|  | 120 sec | $0 \times 10^1$, $0 \times 10^1$ | <1.00, <1.00 | <1.00 | >7.08 |
| 1:143 in 400 ppm hard water | 90 sec | $0 \times 10^1$, $0 \times 10^1$ | <1.00, <1.00 | <1.00 | >7.08 |
|  | 120 sec | $0 \times 10^1$, $0 \times 10^1$ | <1.00, <1.00 | <1.00 | >7.08 |

TABLE 7

Escherichia coli O157:H7 Mixture

| Test Substance | Exposure Time | Survivors (CFU/mL) | $Log_{10}$ Survivors | Average $Log_{10}$ Survivors | Log Reduction |
|---|---|---|---|---|---|
| 1:171 in 400 ppm hard water | 90 sec | $1 \times 10^1$, $4 \times 10^1$ | 1.00, 1.60 | 1.30 | 6.80 |
|  | 120 sec | $2 \times 10^1$, $1 \times 10^1$ | 1.30, 1.00 | 1.15 | 6.95 |
| 1:143 in 400 ppm hard water | 90 sec | $0 \times 10^1$, $0 \times 10^1$ | <1.00, <1.00 | <1.00 | >7.10 |
|  | 120 sec | $0 \times 10^1$, $0 \times 10^1$ | <1.00, <1.00 | <1.00 | >7.10 |

* E. coli O157:H7 ATCC 43895 appeared contaminated before testing, so was not included in the mixture.

TABLE 8

Salmonella enterica Mixture

| Test Substance | Exposure Time | Survivors (CFU/mL) | $Log_{10}$ Survivors | Average $Log_{10}$ Survivors | Log Reduction |
|---|---|---|---|---|---|
| 1:171 in 400 ppm hard water | 90 sec | $0 \times 10^1$, $0 \times 10^1$ | <1.00, <1.00 | <1.00 | >7.04 |
|  | 120 sec | $0 \times 10^1$, $0 \times 10^1$ | <1.00, <1.00 | <1.00 | >7.04 |
| 1:143 in 400 ppm hard water | 90 sec | $1 \times 10^1$, $0 \times 10^1$ | 1.00, <1.00 | <1.00 | >7.04 |
|  | 120 sec | $0 \times 10^1$, $0 \times 10^1$ | <1.00, <1.00 | <1.00 | >7.04 |

TABLE 9

Inoculum Numbers

| Test System | CFU/mL | $Log_{10}$ Growth | Average $Log_{10}$ Growth |
|---|---|---|---|
| Listeria monocytogenes mixture | $134 \times 10^6$, $110 \times 10^6$ | 8.13, 8.04 | 8.09 |
| Escherichia coli O157:H7 mixture | $125 \times 10^6$, $127 \times 10^6$ | 8.10, 8.10 | 8.10 |
| Salmonella enterica mixture | $147 \times 10^6$, $148 \times 10^6$ | 8.17, 8.17 | 8.17 |

TABLE 10

*Listeria monocytogenes* Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 in 400 ppm hard water | 90 sec | $0 \times 10^1$ | <1.00 | <1.00 | >7.09 |
|  | 120 sec | $0 \times 10^1$ | <1.00 | <1.00 | >7.09 |

TABLE 11

*Escherichia coli* O157:H7 Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 in 400 ppm hard water | 90 sec | $585 \times 10^3$ | 5.77 | 5.77 | 2.33 |
|  | 120 sec | $176 \times 10^3$ | 5.25 | 5.25 | 2.85 |

TABLE 12

*Salmonella enterica* Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 in 400 ppm hard water | 90 sec | $74 \times 10^3$ | 4.87 | 4.87 | 3.30 |
|  | 120 sec | $306 \times 10^1$ | 3.49 | 3.49 | 4.68 |

TABLE 13

Inoculum Numbers

| Test System | CFU/mL | $Log_{10}$ Growth | Average $Log_{10}$ Growth |
|---|---|---|---|
| *Listeria monocytogenes* mixture | $99 \times 10^6$, $105 \times 10^6$ | 7.99, 8.02 | 8.01 |
| *Escherichia coli* O157:H7 mixture | $92 \times 10^6$, $92 \times 10^6$ | 7.96, 7.96 | 7.96 |
| *Salmonella enterica* mixture | $104 \times 10^6$, $126 \times 10^6$ | 8.02, 8.10 | 8.06 |

TABLE 14

*Listeria monocytogenes* Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 in 200 ppm hard water | 60 sec | $0 \times 10^1$, $0 \times 10^1$ | <1.00, <1.00 | <1.00 | >7.01 |
|  | 90 sec | $0 \times 10^1$, $124 \times 10^1$ | <1.00, 3.09 | 2.05 | 5.96 |
|  | 120 sec | $0 \times 10^1$, $0 \times 10^1$ | <1.00, <1.00 | <1.00 | >7.01 |
|  | 5 min | $0 \times 10^1$, $0 \times 10^1$ | <1.00, <1.00 | <1.00 | >7.01 |
|  | 10 min | $0 \times 10^1$, $0 \times 10^1$ | <1.00, <1.00 | <1.00 | >7.01 |
| 1:256 in 400 ppm hard water | 5 min | $0 \times 10^1$, $0 \times 10^1$ | <1.00, <1.00 | <1.00 | >7.01 |
|  | 10 min | $0 \times 10^1$, $0 \times 10^1$ | <1.00, <1.00 | <1.00 | >7.01 |

TABLE 15

*Escherichia coli* O157:H7 Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 in 200 ppm hard water | 60 sec | $328 \times 10^5$, $316 \times 10^5$ | 7.51, 7.50 | 7.51 | 0.45 |
|  | 90 sec | $194 \times 10^5$, $212 \times 10^5$ | 7.29, 7.33 | 7.31 | 0.65 |
|  | 120 sec | $106 \times 10^5$, $124 \times 10^5$ | 7.03, 7.09 | 7.06 | 0.90 |
|  | 5 min | $134 \times 10^3$, $178 \times 10^3$ | 5.13, 5.25 | 5.19 | 2.77 |
|  | 10 min | $47 \times 10^1$, $108 \times 10^1$ | 2.67, 3.03 | 2.85 | 5.11 |
| 1:256 in 400 ppm hard water | 5 min | $341 \times 10^1$, $369 \times 10^1$ | 3.53, 3.57 | 3.55 | 4.41 |
|  | 10 min | $2 \times 10^1$, $3 \times 10^1$ | 1.30, 1.48 | 1.39 | 6.57 |

TABLE 16

*Salmonella enterica* Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 in 200 ppm hard water | 60 sec | $258 \times 10^5$, $227 \times 10^5$ | 7.41, 7.36 | 7.39 | 0.67 |
|  | 90 sec | $79 \times 10^5$, $81 \times 10^5$ | 6.90, 6.91 | 6.91 | 1.15 |
|  | 120 sec | $24 \times 10^5$, $19 \times 10^5$ | 6.38, 6.28 | 6.33 | 1.73 |
|  | 5 min | $209 \times 10^1$, $25 \times 10^1$ | 3.32, 2.40 | 2.86 | 5.20 |
|  | 10 min | $0 \times 10^1$, $0 \times 10^1$ | <1.00, <1.00 | <1.00 | >7.06 |
| 1:256 in 400 ppm hard water | 5 min | $0 \times 10^1$, $4 \times 10^1$ | <1.00, 1.60 | 1.30 | 6.76 |
|  | 10 min | $0 \times 10^1$, $0 \times 10^1$ | <1.00, <1.00 | <1.00 | >7.06 |

TABLE 17

Inoculum Numbers

| Test System | CFU/mL | $Log_{10}$ Growth | Average $Log_{10}$ Growth |
|---|---|---|---|
| *Escherichia coli* O157:H7 mixture | $80 \times 10^6$, $110 \times 10^6$ | 7.90, 8.04 | 7.97 |

TABLE 18

*Escherichia coli* O157:H7 Mixture

| Test Substance | Exposure Time | Survivors (CFU/mL) | $Log_{10}$ Survivors | Average $Log_{10}$ Survivors | Log Reduction |
|---|---|---|---|---|---|
| 1:256 DI water | 90 sec | $5 \times 10^1$, $7 \times 10^1$ | 1.70, 1.84 | 1.77 | 6.20 |
| 1:256 in 200 ppm HW |  | $218 \times 10^5$, $212 \times 10^5$ | 7.34, 7.33 | 7.34 | 0.63 |
| 1:256 in 400 ppm HW |  | $46 \times 10^5$, $45 \times 10^5$ | 6.66, 6.65 | 6.66 | 1.31 |
| 1:192 in DI water |  | $0 \times 10^1$, $1 \times 10^1$ | <1.00, 1.00 | <1.00 | >6.97 |

TABLE 18-continued

*Escherichia coli* O157:H7 Mixture

| Test Substance | Exposure Time | Survivors (CFU/mL) | Log$_{10}$ Survivors | Average Log$_{10}$ Survivors | Log Reduction |
|---|---|---|---|---|---|
| 1:192 in 200 ppm HW | | 20 × 10$^1$, 8 × 10$^1$ | 2.30, 1.90 | 2.10 | 5.87 |
| 1:192 in 400 ppm HW | | 40 × 10$^1$, 18 × 10$^1$ | 2.60, 2.26 | 2.43 | 5.54 |
| 1:128 in DI water | | 1 × 10$^1$, 0 × 10$^1$ | 1.00, <1.00 | <1.00 | >6.97 |
| 1:128 in 200 ppm HW | | 0 × 10$^1$, 0 × 10$^1$ | <1.00, <1.00 | <1.00 | >6.97 |
| 1:128 in 400 ppm HW | | 0 × 10$^1$, 0 × 10$^1$ | <1.00, <1.00 | <1.00 | >6.97 |

TABLE 19

Inoculum Numbers

| Test System | CFU/mL | Log$_{10}$ Growth | Average Log$_{10}$ Growth |
|---|---|---|---|
| *Listeria monocytogenes* mixture | 108 × 10$^6$, 113 × 10$^6$ | 8.03, 8.05 | 8.04 |
| *Escherichia coli* O157:H7 mixture | 94 × 10$^6$, 130 × 10$^6$ | 7.97, 8.11 | 8.04 |
| *Salmonella enterica* mixture | 183 × 10$^6$, 183 × 10$^6$ | 8.26, 8.26 | 8.26 |

TABLE 20

*Listeria monocytogenes* Mixture

| Test Substance | Exposure Time | Survivors (CFU/mL) | Log$_{10}$ Survivors | Average Log$_{10}$ Survivors | Log Reduction |
|---|---|---|---|---|---|
| 1:200 in 200 ppm hard water | 90 sec | 0 × 10$^1$, 0 × 10$^1$ | <1.00, <1.00 | <1.00 | >7.04 |
| 1:200 in 200 ppm hard water | 120 sec | 0 × 10$^1$, 0 × 10$^1$ | <1.00, <1.00 | <1.00 | >7.04 |
| 1:200 in 400 ppm hard water | 90 sec | 0 × 10$^1$, 0 × 10$^1$ | <1.00, <1.00 | <1.00 | >7.04 |
| 1:200 in 400 ppm hard water | 120 sec | 0 × 10$^1$, 0 × 10$^1$ | <1.00, <1.00 | <1.00 | >7.04 |
| 1:220 in 200 ppm hard water | 90 sec | 0 × 10$^1$, 0 × 10$^1$ | <1.00, <1.00 | <1.00 | >7.04 |
| 1:220 in 200 ppm hard water | 120 sec | 0 × 10$^1$, 0 × 10$^1$ | <1.00, <1.00 | <1.00 | >7.04 |
| 1:220 in 400 ppm hard water | 90 sec | 10 × 10$^1$, 10 × 10$^1$ | 2.00, 2.00 | 2.00 | 6.04 |
| 1:220 in 400 ppm hard water | 120 sec | 74 × 10$^1$, 12 × 10$^1$ | 2.87, 2.08 | 2.47 | 5.57 |

TABLE 21

*Escherichia coli* O157:H7 Mixture

| Test Substance | Exposure Time | Survivors (CFU/mL) | Log$_{10}$ Survivors | Average Log$_{10}$ Survivors | Log Reduction |
|---|---|---|---|---|---|
| 1:200 in 200 ppm hard water | 90 sec | 183 × 10$^3$, 72 × 10$^3$ | 5.26, 4.86 | 5.06 | 2.98 |
| 1:200 in 200 ppm hard water | 120 sec | 9 × 10$^3$, 4 × 10$^3$ | 3.95, 3.60 | 3.78 | 4.26 |
| 1:200 in 400 ppm hard water | 90 sec | 58 × 10$^3$, 71 × 10$^3$ | 4.76, 4.85 | 4.81 | 3.24 |
| 1:200 in 400 ppm hard water | 120 sec | 4 × 10$^3$, 276 × 10$^1$ | 3.60, 3.44 | 3.52 | 4.52 |
| 1:220 in 200 ppm hard water | 90 sec | 11 × 10$^5$, 15 × 10$^5$ | 6.04, 6.18 | 6.11 | 1.93 |
| 1:220 in 200 ppm hard water | 120 sec | 323 × 10$^3$, 185 × 10$^5$ | 5.51, 5.27 | 5.39 | 2.66 |
| 1:220 in 400 ppm hard water | 90 sec | 13 × 10$^5$, 17 × 10$^5$ | 6.11, 6.23 | 6.17 | 1.87 |
| 1:220 in 400 ppm hard water | 120 sec | 240 × 10$^3$, 6 × 10$^5$ | 5.38, 5.78 | 5.58 | 2.46 |

TABLE 22

*Salmonella enterica* Mixture

| Test Substance | Exposure Time | Survivors (CFU/mL) | Log$_{10}$ Survivors | Average Log$_{10}$ Survivors | Log Reduction |
|---|---|---|---|---|---|
| 1:200 in 200 ppm hard water | 90 sec | 1 × 10$^1$, 0 × 10$^1$ | 1.00, <1.00 | <1.00 | >7.26 |
| 1:200 in 200 ppm hard water | 120 sec | 0 × 10$^1$, 6 × 10$^1$ | <1.00, 1.78 | 1.39 | 6.87 |

TABLE 22-continued

Salmonella enterica Mixture

| Test Substance | Exposure Time | Survivors (CFU/mL) | Log$_{10}$ Survivors | Average Log$_{10}$ Survivors | Log Reduction |
|---|---|---|---|---|---|
| 1:200 in 400 ppm hard water | 90 sec | $1 \times 10^1, 5 \times 10^1$ | 1.00, 1.70 | 1.35 | 6.91 |
| | 120 sec | $0 \times 10^1, 0 \times 10^1$ | <1.00, <1.00 | <1.00 | >7.26 |
| 1:220 in 200 ppm hard water | 90 sec | $230 \times 10^1, 178 \times 10^1$ | 3.36, 3.25 | 3.31 | 4.96 |
| | 120 sec | $1 \times 10^1, 0 \times 10^1$ | 1.00, <1.00 | <1.00 | 7.26 |
| 1:220 in 400 ppm hard water | 90 sec | $15 \times 10^3, 7 \times 10^3$ | 4.18, 3.84 | 4.01 | 4.25 |
| | 120 sec | $31 \times 10^1, 40 \times 10^1$ | 2.49, 2.60 | 2.55 | 5.72 |

The results are also summarized in the tables below.

TABLE 23

Listeria monocytogenes

Produce Wash in 200 ppm Hard Water
Log Reduction

| Dilution | 60 sec | 90 sec | 120 sec | 5 min | 10 min |
|---|---|---|---|---|---|
| 1:256 | >7.01 | 5.96 | >7.01 | >7.01 | >7.01 |
| 1:220 | | >7.04 | >7.04 | | |
| 1:290 | | >7.04 | >7.04 | | |
| 1:128 | | | | | |

Produce Wash in 400 ppm Hard Water
Log Reduction

| Dilutions | 90 sec | 120 sec | 5 min | 10 min |
|---|---|---|---|---|
| 1:256 | >7.09 | >7.09 | >7.01 | >7.01 |
| 1:220 | 6.04 | 5.57 | | |
| 1:200 | >7.04 | >7.04 | | |
| 1:171 | >7.08 | >7.08 | | |
| 1:143 | >7.08 | >7.08 | | |
| 1:128 | | | | |

TABLE 24

Escherichia coli O157:H7

Produce Wash in DI Water
Log Reduction

| Dilution | 90 sec |
|---|---|
| 1:256 | 6.20 |
| 1:192 | >6.97 |
| 1:128 | >6.97 |

Produce Wash in 200 ppm Hard Water
Log Reduction

| Dilution | 60 sec | 90 sec | 120 sec | 5 min | 10 min |
|---|---|---|---|---|---|
| 1:256 | 0.45 | 0.65/0.63 | 0.90 | 2.77 | 5.11 |
| 1:220 | | 1.93 | 2.66 | | |
| 1:200 | | 2.98 | 4.26 | | |
| 1:192 | | 5.54/5.87 | | | |
| 1:128 | | >6.97 | | | |

Produce Wash in 400 ppm Hard Water
Log Reduction

| Dilution | 90 sec | 120 sec | 5 min | 10 min |
|---|---|---|---|---|
| 1:256 | 2.33/1.31 | 2.85 | 4.41 | 6.57 |
| 1:220 | 1.87 | 2.46 | | |
| 1:200 | 3.24 | 4.52 | | |

TABLE 24-continued

Escherichia coli O157:H7

| 1:192 | 5.54 | |
| 1:171 | 6.80 | 6.95 |
| 1:143 | >7.10 | >7.10 |
| 1:128 | >6.97 | |

TABLE 25

Salmonella enterica

Produce Wash in 200 ppm Hard Water
Log Reduction

| Dilution | 60 sec | 90 sec | 120 sec | 5 min | 10 min |
|---|---|---|---|---|---|
| 1:256 | 0.67 | 1.15 | 1.73 | 5.20 | >7.06 |
| 1:220 | | 4.96 | 7.26 | | |
| 1:200 | | >7.26 | 6.87 | | |
| 1:128 | | | | | |

Produce Wash in 400 ppm Hard Water
Log Reduction

| Dilution | 90 sec | 120 sec | 5 min | 10 min |
|---|---|---|---|---|
| 1:256 | 3.30 | 4.68 | 6.76 | >7.06 |
| 1:220 | 4.25 | 5.72 | | |
| 1:200 | 6.91 | >7.26 | | |
| 1:171 | >7.04 | >7.04 | | |
| 1:143 | >7.04 | >7.04 | | |
| 1:128 | | | | |

As can be seen from these results, the exemplary formulations tested achieved significant antimicrobial performance at multiple concentrations in the wash water solution. Antimicrobial reductions achieved will reduce cross contamination that could occur during the washing of produce and maintain a sterile wash basin for additional food processing. In some applications in which extended contact times are allowed, the exemplary formulations tested showed expanded antimicrobial performance over tested performance intervals at the full range of concentrations tested.

Example 4

A study was performed to evaluate the residual efficacy of an exemplary produce wash composition in accordance with embodiments of the present disclosure to reduce *Listeria monocytogenes*, *Escherichia coli* O157:H7 and *Salmonella enterica* on the surface of spinach leaves. The following produce wash composition was used for this study:

TABLE 26

| Produce Wash | |
|---|---|
| Composition | Amount (weight %) |
| DI Water | 67.95 |
| Anionic Surfactant | 1.37 |
| Combination of Acidulants | 26.32 |
| Stabilizing Agent | 3.06 |
| Thickening Agent | 0.70 |
| Defoaming agent | 0.60 |

For this study, pre-washed spinach leaves were purchased from a local grocery store. The leaves were sorted, and those that were broken or looked damaged were discarded. Five leaves per treatment and control were picked. The leaves were placed spine side down on a rack. Each leaf was inoculated with 8-10 spots, equaling a total of 100 μL, of prepared $10^{-8}$ Colony forming units (CFU)/mL of Test System culture. The following Test Systems were used: Test System 1 included a *Listeria monocytogenes* mixture that included *L. monocytogenes* ATCC 49594, *L. monocytogenes* ATCC 19114, and *L. monocytogenes* ATCC 19116. Test System 2 included an *Escherichia coli* O157:H7 mixture that included *E. coli* O157:H7 ATCC 43895, *E. coli* O157:H7 ATCC 35150, and *E. coli* O157:H7 ATCC 43890.

After the leaves were inoculated, they were dried at room temperature for 45 minutes, or until the inoculum was visibly dry. Then, 300 mL of the test substance (diluted produce wash) was dispensed into a 600 mL beaker. The test substance dilutions used in this study are shown below.

TABLE 27

| Desired Concentration | Diluent | Test Solution (Volume of Test Substance/ Total Volume) | pH |
|---|---|---|---|
| 0.75 oz/gal | 380 ppm Synthetic Hard Water (pH 7.71) | 10.4 g/1951.4 g | n/a |

TABLE 27-continued

| Desired Concentration | Diluent | Test Solution (Volume of Test Substance/ Total Volume) | pH |
|---|---|---|---|
| 0.75 oz/gal | 400 ppm Synthetic Hard Water (pH 7.71) | 10.4 g/2000.0 g | 2.98 |

Samples were exposed to the bulk test substance for 90 seconds then removed and allowed a dwell time equal to sample times listed in table 29 below, viz., pre-exposure, immediately post exposure, 2 minutes post-exposure, 5 minutes post-exposure, 10 minutes post-exposure, 15 minutes post-exposure, and 30 minutes post-exposure. At the end of the desired evaluation time, extended activity profile was measured post neutralization vs. an equivalent water control at each time point. Extended activity is a measurement of cumulative kill independent of reduction observed in bulk solution.

The results from this study are shown in the tables below.

TABLE 28

| | Inoculum Numbers | | |
|---|---|---|---|
| Test System | CFU/mL | $Log_{10}$ Growth | Average $Log_{10}$ Growth |
| *Listeria monocytogenes* mixture | 73 × $10^6$, 81 × $10^6$ | 7.86, 7.91 | 7.89 |

TABLE 29

| *Listeria monocytogenes* Mixture | | | | |
|---|---|---|---|---|
| Sample Time | Survivors (CFU/Surface) | $Log_{10}$ Growth | Avg. $Log_{10}$ Growth | Log Reduction |
| Pre-exposure | 1.00 × $10^6$, 2.20 × $10^6$, 1.40 × $10^6$, 8.00 × $10^5$, 2.40 × $10^6$ | 6.00, 6.34, 6.15, 5.90, 6.38 | 6.15 | N/A |
| Immediately Post-exposure | 1.88 × $10^3$, 2.40 × $10^2$, 1.60 × $10^2$, <2.00 × $10^1$, 4.20 × $10^2$ | 3.27, 2.38, 2.20, <1.30, 2.62 | 2.34 | 3.81 |
| 2 minutes Post-exposure | 8.80 × $10^2$, 2.32 × $10^3$, 4.00 × $10^1$, 2.20 × $10^2$, 8.00 × $10^1$ | 2.94, 3.37, 1.60, 2.34, 1.90 | 2.43 | 3.72 |
| 5 minutes Post-exposure | 8.00 × $10^1$, 8.00 × $10^1$, 1.20 × $10^4$, 1.60 × $10^2$, 4.00 × $10^1$ | 1.90, 1.90, 4.08, 2.20, 1.60 | 2.34 | 3.81 |
| 10 minutes Post-exposure | 4.40 × $10^4$, 8.60 × $10^2$, <2.00 × $10^1$, 3.62 × $10^3$, <2.00 × $10^1$ | 4.64, 2.93, <1.30, 2.56, <1.30 | 2.75 | 3.40 |
| 15 minutes Post-exposure | <2.00 × $10^1$, <2.00 × $10^1$, 3.00 × $10^2$, <2.00 × $10^1$, <2.00 × $10^1$ | <1.30, <1.30, 2.48, <1.30, <1.30 | 1.54 | 4.61 |
| 30 minutes Post-exposure | 2.00 × $10^2$, 1.00 × $10^2$, <2.00 × $10^1$, 2.00 × $10^1$, <2.00 × $10^1$ | 2.30, 2.00, <1.30, 1.30, <1.30 | 1.64 | 4.51 |

TABLE 30

| | Inoculum Numbers | | |
|---|---|---|---|
| Test System | CFU/mL | $Log_{10}$ Growth | Average $Log_{10}$ Growth |
| *Escherichia coli* O157:H7 mixture | 176 × $10^6$, 201 × $10^6$ | 8.25, 8.30 | 8.27 |

TABLE 31

*Escherichia coli* O157:H7 Mixture

| Sample Time | Survivors (CFU/Surface) | $Log_{10}$ Growth | Avg. $Log_{10}$ Growth | Log Reduction |
|---|---|---|---|---|
| Pre-exposure | $1.62 \times 10^5$, $1.34 \times 10^5$, $1.04 \times 10^5$, $1.48 \times 10^5$, $1.88 \times 10^5$ | 5.21, 5.13, 5.02, 5.17, 5.27 | 5.16 | N/A |
| Immediately Post-exposure | $6.00 \times 10^3$, $2.00 \times 10^3$, $2.00 \times 10^3$, $5.00 \times 10^4$, $4.82 \times 10^3$ | 3.78, 3.30, 3.30, 4.70, 3.68 | 3.75 | 1.41 |
| 2 minutes Post-exposure | $1.80 \times 10^4$, $1.40 \times 10^4$, $4.00 \times 10^3$, $1.20 \times 10^4$, $1.60 \times 10^4$ | 4.25, 4.15, 3.60, 4.08, 4.20 | 4.06 | 1.10 |
| 5 minutes Post-exposure | $6.00 \times 10^3$, $1.04 \times 10^3$, $9.60 \times 10^2$, $1.20 \times 10^3$, $7.20 \times 10^2$ | 3.78, 3.02, 2.98, 3.08, 2.86 | 3.14 | 2.02 |
| 10 minutes Post-exposure | $1.00 \times 10^2$, $<2.00 \times 10^1$, $2.04 \times 10^3$, $4.80 \times 10^2$, $8.00 \times 10^1$ | 2.00, <1.30, 3.31, 2.68, 1.90 | 2.24 | 2.92 |
| 15 minutes Post-exposure | $<2.00 \times 10^1$, $8.00 \times 10^1$, $1.28 \times 10^3$, $<2.00 \times 10^1$, $4.00 \times 10^1$ | <1.30, 1.90, 3.11, 1.30, 1.60 | 1.84 | 3.32 |
| 30 minutes Post-exposure | $2.00 \times 10^1$, $4.00 \times 10^1$, $<2.00 \times 10^1$, $8.80 \times 10^2$, $3.00 \times 10^2$ | 1.30, 1.60, <1.30, 2.94, 2.48 | 1.92 | 3.24 |

As can be seen from these results, the exemplary produce wash composition carried over on the surface of the treated materials achieved expanded kill performance for at least 45 minutes post bulk solution exposure. This expanded kill on the surface of produce enhances food safety benefits to the formulation and falls within many field applications.

Example 6

A study was performed to compare the effect of different acids on exemplary antimicrobial produce wash compositions. For this study, lactic acid, and sodium acid sulfate (SAS) were used. The produce wash compositions tested are shown in the table below.

TABLE 32

| Formula A (Lactic Acid) | | Formula B (SAS) | |
|---|---|---|---|
| Raw Material | Amt (g) | Raw Material | Amt (g) |
| Anionic Surfactant | 0.64 | Anionic Surfactant | 0.64 |
| Acidulant | 0.50 | Acidulant | 1.50 |
| Defoaming Agent | 0.25 | Defoaming Agent | 0.25 |
| Lactic Acid, 88% | 8.92 | Sodium Bisulfate | 2.65 |
| Thickener | 0.75 | Thickener | 0.75 |
| Stabilizing Agent | 2.57 | Stabilizing Agent | 2.57 |
| Grapefruit Oil | 0.05 | Grapefruit Oil | 0.05 |
| DI Water | 86.32 | DI Water | 91.59 |
| Total | 100.00 | Total | 100.00 |
| pH after dilution | 3.12 | pH after dilution | 3.04 |

Both Formula A and Formula B were diluted at 1:64 ratio in 205 ppm synthetic hard water, and were tested against *Escherichia coli* ATCC 11229 at 1 and 2 minute exposure times. For this study, 99 mL of the selected test substance (Formula A or B diluted) was dispensed into a sterile 250 mL Erlenmeyer flask. Duplicate flasks with 99 mL of sterile phosphate buffered dilution water (PBDW) were also prepared for determination of the inoculum populations. The test flasks were vigorously swirled. While the liquid in the flask was still in motion, the tip of a pipette containing 1 mL of the selected Test System suspension was immersed in the test substance midway between the center and the edge of the flask. One (1) mL of the Test System suspension was dispensed into 99 mL of the test substance (Formula A or B diluted). There was also a 10% vegetable soil in the hard water.

After the selected exposure time, 1 mL of the test substance mixture was transferred into 9 mL of an inactivating agent using a sterile pipette and vortex to mix. This tube was considered to contain a $10^{-1}$ dilution of the test solution. For the test substance use solution test samples, 1 mL and 0.1 mL from the $10^{-1}$ inactivating agent tube were plated. For the inoculum population tests, a $10^{-5}$ and a $10^{-7}$ dilution in PBDW were prepared. 1 mL and 0.1 mL from these dilutions were plated. The plates were inverted and allowed to incubate at 35±2° C. for 48±4 hours. The results from this study are shown in the tables below.

TABLE 33

| Inoculum Numbers | | | |
|---|---|---|---|
| Test System | CFU/mL | $Log_{10}$ Growth | Average $Log_{10}$ Growth |
| *Escherichia coli* ATCC 11229 | $78 \times 10^6$ | 7.89 | 7.89 |
| | $77 \times 10^6$ | 7.89 | |

TABLE 34

*Escherichia coli* ATCC 11229

| Test Substance | Exposure Time | Survivors (CFU/mL) | $Log_{10}$ Growth | Average $Log_{10}$ Growth | Log Reduction |
|---|---|---|---|---|---|
| Formula A | 1 min | $110 \times 10^1$, $44 \times 10^1$ | 3.04, 2.64 | 2.84 | 5.05 |
| (Lactic Acid) | 2 min | $0 \times 10^1$, $0 \times 10^1$ | <1.00, <1.00 | <1.00 | >6.89 |
| Formula B | 1 min | $68 \times 10^3$, $66 \times 10^3$ | 4.83, 4.82 | 4.82 | 3.07 |
| (SAS) | 2 min | $123 \times 10^1$, $29 \times 10^3$ | 3.09, 4.46 | 3.78 | 4.11 |

As can be seen from these results, Formula A which contained lactic acid had about a 5 log reduction after only 1 minute. Formula B which contained SAS only had about a 3 log reduction after 1 minute. Thus, Formula A passed with greater than the recommended 4 log reduction after 1 minute and 2 minutes, against *E. coli*. Formula B (the SAS produce wash) only passed with greater than a 4 log reduction after 2 minutes, against *E. coli*. Overall, it was found that the lactic acid produce wash preformed better than the SAS produce wash.

The foregoing summary, detailed description, and examples provide a sound basis for understanding the disclosure, and some specific example embodiments of the disclosure. Since the disclosure can comprise a variety of embodiments, the above information is not intended to be limiting. The invention resides in the claims.

The invention claimed is:

1. A single phase aqueous low foaming antimicrobial concentrate composition comprising:
   (a) at least about 25 wt % water;
   (b) between about 0.01 wt % and about 50 wt % of an antimicrobial agent selected from the group consisting of an anionic surfactant, a quaternary ammonium compound, and mixtures thereof;
   (c) between about 0.01 wt % and about 10.0 wt % of a defoaming agent;
   (d) between about 19 wt % and about 26 wt % of an acidulant;
   (e) between about 0.1 wt % and about 5.0 wt % of a stabilizing agent;
   (f) between about 0.1 wt % and about 10 wt % of a thickening agent; and
   wherein the composition has a viscosity of between about 500 centipoise and about 3500 centipoise, and the thickening agent is present in an amount effective such that the composition is phase stable under acidic conditions, wherein the composition is free of a chlorite, and an oxidizing agent; and
   wherein the composition can be applied directly to food surfaces and food contact surfaces, without need to be rinsed off;
   wherein the composition is microbiocidal.

2. The composition of claim 1, wherein the anionic surfactant is selected from the group consisting of alkyl sulfates, alkyl sulfonates, alkyl aryl sulfonates, sulfonated fatty acids, sulfonated fatty acid esters, sulfonated carboxylic acid esters, and mixtures thereof.

3. The composition of claim 1, wherein the composition is free of a C5 to C11 carboxylic acid.

4. The composition of claim 1, wherein the defoaming agent comprises a silicone defoaming agent.

5. The composition of claim 1, wherein the thickening agent is selected from the group consisting of natural polysaccharide or cellulose thickeners, plant exudates, seaweed extracts, water soluble polymers, poly acrylic acid based thickeners, polyacrylamide based thickeners, inorganic clay based thickeners, and mixtures thereof.

6. The composition of claim 1, wherein the acidulant comprises a food additive ingredient.

7. The composition of claim 1, wherein the acidulant is selected from the group consisting of citric acid, sodium bisulfate, acetic acid, adipic acid, tartaric acid, propionic acid, malic acid, lactic acid, sulfuric acid, and derivatives and mixtures thereof.

8. The composition of claim 1, wherein the composition has a pH of less than about 3.2.

9. The composition of claim 1, wherein the composition further comprises an additional ingredient selected from the group consisting of a surfactant, a processing aid, a dye, a colorant, an odorant, and mixtures thereof.

10. The composition of claim 1, wherein the stabilizing agent is present at an amount effect to prevent the formation of a precipitate for at least 24 hours when the composition is diluted with 500 ppm hard water.

11. The composition of claim 1, wherein the stabilizing agent comprises a block copolymer of ethylene oxide and propylene oxide.

12. The composition of claim 11, wherein the copolymers have a molecular weight of about 5,000 to about 10,000 and the percentage of ethylene oxide is between about 70 to about 90.

* * * * *